Nov. 21, 1967   K. R. GREER   3,353,802
LIQUID DISTRIBUTOR

Filed April 18, 1966   2 Sheets-Sheet 1

INVENTOR
KENT REANEY GREER

By Cushman, Darby & Cushman
ATTORNEY

United States Patent Office 3,353,802
Patented Nov. 21, 1967

3,353,802
LIQUID DISTRIBUTOR
Kent Reaney Greer, Marple Bridge, England, assignor to Imperial Chemical Industries Limited, London, England, a corporation of Great Britain
Filed Apr. 18, 1966, Ser. No. 543,110
Claims priority, application Great Britain, Apr. 20, 1965, 16,542/65
5 Claims. (Cl. 261—110)

The present invention relates to a device for assisting in the distribution of liquids in cooling towers, sewage farms, and scrubbers in chemical plants.

In water cooling towers of rectangular horizontal cross-section there has been a long standing problem in ensuring that the water is uniformly distributed over the whole cross-sectional area of the tower. The problem arises because the water is fed from perforations in the arms of a rotating distributor with the result that the water falls over a circular area, and the whole cooling volume of the tower is not therefore efficiently used. The same problem arises in any structure where there is a requirement that a liquid should be caused to descend in droplets or as a film so that it may be cooled or processed in some way, e.g. in scrubbers in chemical plants or in sewage farms, and where the structure has a rectangular cross-section and where the liquid is distributed over a circular area.

In accordance with the present invention there is provided a structure enclosing a space of rectangular horizontal cross-section through which liquid can be caused to descend downwards either in the form of drops or as a film in contact with a plurality of surfaces, the structure having means for distributing liquid over a circular area, four catchment trays being located at equal intervals around the circumference of said area each substantially of right-angled triangular form so as to form in combination with said circular area a substantially square area, the edge of each tray opposite the right angled corner overlapping said circular area to an extent sufficient for said liquid distributing means to deposit liquid on the overlapping part of the tray, the tray being perforated and inclined downwardly in a direction away from said circular area, such liquid deposited onto each tray runs towards the remoter parts thereof and passes through said perforations.

In a preferred form of our invention said means for distributing liquid comprises one or more perforated arms mounted on a central axis for rotation in a horizontal plane whereby liquid can be caused to flow into said arms and be distributed therefrom through the perforations.

Figure 1:
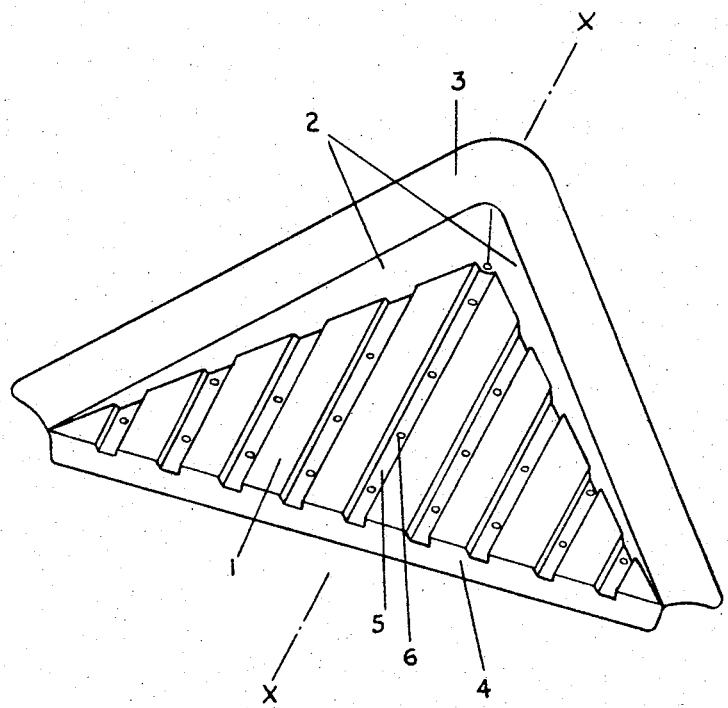
Figure 2:
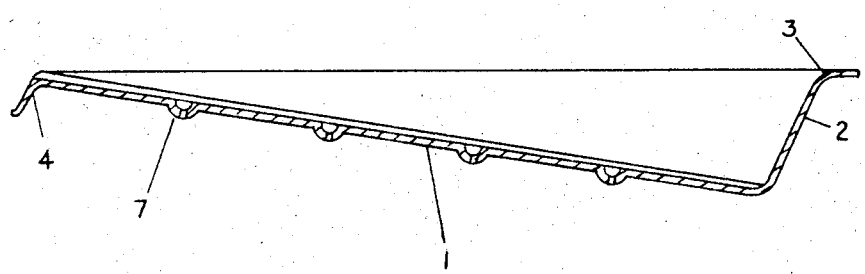
Figure 3:
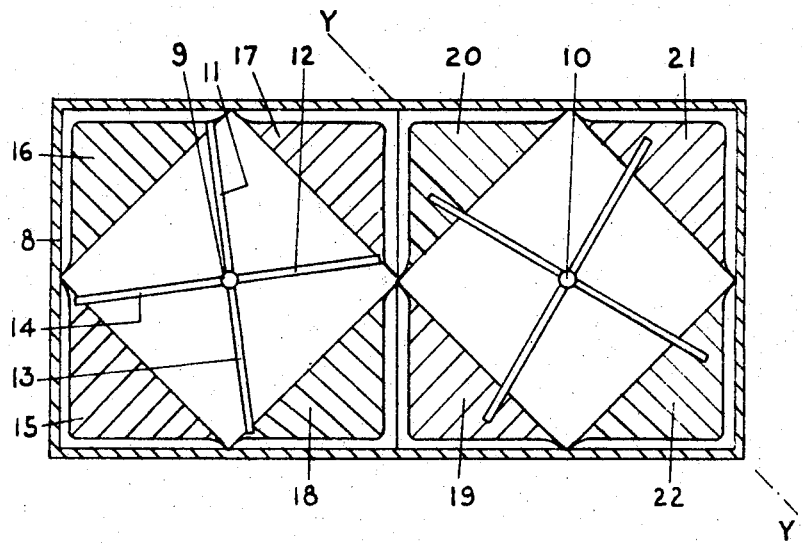
Figure 4:
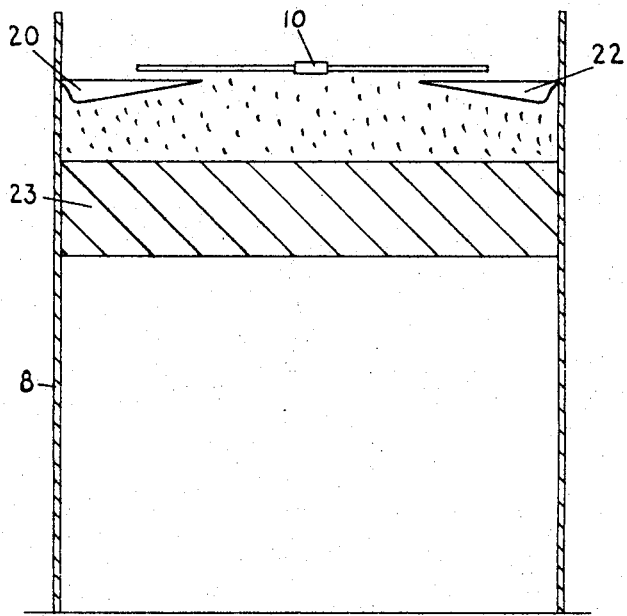

In order that the invention may be more readily understood, one embodiment thereof will be described with reference to the drawings which accompanied the provisional specification in which:

FIGURE 1 is a perspective view of a catchment tray;
FIGURE 2 is a cross-sectional side elevation through the line X—X;
FIGURE 3 is a cross-sectional plan view of a water cooling tower embodying the invention;
FIGURE 4 is a cross-sectional side elevation through the line Y—Y.

The tray illustrated in FIGURE 1 is a single piece moulding made by vacuum forming rigid polyvinyl chloride sheet 0.125 inch thick. The method by which the tray is formed is conventional and forms no part of the present invention. The tray has a base 1 from which the vertical side walls 2 rise terminating in the horizontal lip 3. The base 1 terminates in the downwardly formed lip 4.

The base 1 of the tray, has nine channels each running from the lip 4 to the side walls 2. One of the channels is indicated by the reference 5. Each channel is perforated as indicated by the reference 6. The perforations are each formed in a hemispherical depression 7 formed in the channel.

FIGURES 3 and 4 illustrate a water cooling tower which is of oblong shape in horizontal cross-section but of such dimensions that it can be regarded as two squares side by side. The tower has an outer wall 8 made of concrete. At the top of the tower are two rotating water spray devices. They consist of the central portions 9 and 10 which can rotate, and to each of which is connected the liquid feed. From each central portion four arms project forming a spray unit, those from central portion 9 being indicated by the reference numerals 11, 12, 13 and 14. Each arm is hollow and perforated along its length so that as water is fed to the central portion the arms are caused to rotate and the water issues as a spray from the perforations in the arms.

Beneath each of the two spray units are four catchment trays 15, 16, 17, 18 and 19, 20, 21, 22 respectively. These trays are so placed as to convert the circular area traversed by each spray unit into a square area. Beneath the trays is a layer of packing 23 formed from thin sheets of polyvinyl chloride onto which the drops of water from the rotating arms fall and form a film so as to expose a large area to the cooling current of air rising from the base of the tower.

Materials other than polyvinyl chloride can be used to form the catchment trays, e.g. metals, polymethyl methacrylate, polyethylene, polypropylene and polystyrene. Polyvinyl chloride and copolymers of vinyl chloride containing at least 80% of vinyl chloride are preferred because (a) manufacture of trays from these materials is particularly easy, and (b) these polymers and copolymers have good chemical resistance and can be used in scrubbing towers in chemical plant where corrosive liquids or gases may be used.

The trays may be flat with perforations. We prefer to have channels in the base of the trays so that the liquid is directed to flow in particular directions towards the outer extremities of each tray. We further prefer that the perforations should be located in small depressions, e.g. hemispherical depressions, formed in the base of the tray. This ensures that drops of liquid passing through the perforations drop from the tray in a fairly uniform manner without any tendency to run along the underside of the tray and then fall from one particular place.

In order to obtain a substantially uniform distribution of liquid over the area formed by the rotating arms and the catchment trays, the arms can be modified so that the ratio of the volume of liquid distributed onto the trays by the liquid distributing means to the volume of liquid fed to the rest of the area is roughly the same as the ratio of the combined areas of the trays to the rest of the swept area. This can be effected by providing more, or bigger, perforations at the ends of the perforated arms in order to ensure that the appropriate volume of liquid is fed from the ends.

By enabling distribution of the liquid over a square area from a rotating distributor that traverses a circular area it is possible to make the most efficient use of the module system of packings in cooling towers and scrubbers. Our invention is applicable also to sewage farms where effluent can be treated on similar plant. The walls of the structures to which the invention is applied can take any conventional form and can be built from any conventional material, e.g. concrete, timber or plastics. Similarly the packing within the structure, where this is present, can also be of conventional form and made from conventional materials.

I claim:
1. A gas-liquid contact structure enclosing a space of rectangular horizontal cross-section through which liquid can be caused to descend downwards, the structure having means for distributing liquid over a circular area, four catchment trays being located at equal intervals around the circumference of said circular area each substantially of right-angled triangular form so as to form in combination with said circular area a substantially square area, the edge of each tray opposite the right-angled corner overlapping said circular area to an extent sufficient for said liquid distributing means to deposit liquid on the overlapping part of the tray, the tray being perforated and inclined downwardly in a direction away from said circular area, so that liquid deposited onto each tray runs towards the remoter parts thereof and passes through said perforations.

2. A structure as claimed in claim 1 in which the means for distributing liquid comprises at least one perforated arm mounted on a central axis for rotation in a horizontal plane whereby liquid can be caused to flow into said perforated arm and be distributed therefrom through the perforations.

3. A structure as claimed in claim 1 in which the perforations provided in a tray are located in depressions formed in the base of the tray.

4. A structure as claimed in claim 1 in which the perforations provided in a tray are located in hemispherical depressions formed in the base of the tray.

5. A structure as claimed in claim 1 in which the base of each tray is provided with channels so that the liquid is directed to flow towards the outer extremities of a tray, the perforations in the base of the tray being located in the channels provided.

References Cited

UNITED STATES PATENTS

| | | | |
|---|---|---|---|
| 386,777 | 7/1888 | Griesser | 261—112 |
| 633,992 | 10/1899 | Fullerton | 261—113 |
| 1,654,826 | 1/1928 | Moore | 261—112 |
| 1,749,266 | 3/1930 | Sontag | 261—113 |
| 2,783,982 | 3/1957 | Kahl | 261—110 XR |

HARRY B. THORNTON, *Primary Examiner.*

E. H. RENNER, *Assistant Examiner.*